United States Patent
Bjørner et al.

(10) Patent No.: US 7,290,019 B2
(45) Date of Patent: Oct. 30, 2007

(54) GARBAGE COLLECTION OF TOMBSTONES FOR OPTIMISTIC REPLICATION SYSTEMS

(75) Inventors: Nikolaj S. Bjørner, Woodinville, WA (US); Dan Teodosiu, Bellevue, WA (US); Rostislav Yavorskiy, Moscow (RU)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 10/779,030

(22) Filed: Feb. 13, 2004

(65) Prior Publication Data

US 2004/0177100 A1   Sep. 9, 2004

Related U.S. Application Data

(60) Provisional application No. 60/477,638, filed on Jun. 10, 2003, provisional application No. 60/451,708, filed on Mar. 3, 2003.

(51) Int. Cl.
*G06F 17/30* (2006.01)

(52) U.S. Cl. ...................... 707/206; 707/203; 707/204; 707/205

(58) Field of Classification Search ...................... None
See application file for complete search history.

(56) References Cited

U.S. PATENT DOCUMENTS

| 5,724,575 | A | * | 3/1998 | Hoover et al. | 707/10 |
| 5,806,065 | A | * | 9/1998 | Lomet | 707/8 |
| 6,256,634 | B1 | * | 7/2001 | Moshaiov et al. | 707/100 |
| 2003/0130984 | A1 | * | 7/2003 | Quinlan et al. | 707/1 |

* cited by examiner

*Primary Examiner*—Jeffrey Gaffin
*Assistant Examiner*—Tomasz Ponikiewski
(74) *Attorney, Agent, or Firm*—Workman Nydegger

(57) ABSTRACT

A method and system for synchronizing objects among members of a replica set. Objects on members of the replica set are quickly synchronized via a join algorithm that takes advantage of version vectors. When an object is deleted, the object is tombstoned (i.e., marked as "dead"). Tombstones are also replicated between the connected members of the replica set. After a period of time (e.g., a timeout), the tombstones are deleted. A slow sync algorithm executes periodically to ensure that objects that were not deleted via replicated tombstones are eventually deleted. An époque algorithm provides that members that have been offline for a long period of time will update their objects before they participate in a join synchronization.

23 Claims, 7 Drawing Sheets

Initially:
$W_A: [A \rightarrow 0, B \rightarrow 0]$
$DB_A: []$

201 MACHINE B
210 Doc
211 Pub

Send $W_A$

Send updates

202 MACHINE A

CREATE [B, U1] : Doc: U1, (B,1), LIVE

CREATE [B, U2] : Pub: U2, (B,2), LIVE $W_B: [B \rightarrow 2]$
$DB_B: [U1 \rightarrow \{(B,1), U1, C1, LIVE\},$
$U2 \rightarrow \{(B,2), U2, C2, LIVE\}]$ After synchronization:
$W_A: [A \rightarrow 0, B \rightarrow 2]$
$DB_A: [U1 \rightarrow \{(B,1), U1, C1, LIVE\},$
$U2 \rightarrow \{(B,2), U2, C2, LIVE\}]$

GARBAGE COLLECTION OF TOMBSTONES FOR OPTIMISTIC REPLICATION SYSTEMS

CROSS-REFERENCE TO RELATED APPLICATION

This application claims the benefit of U.S. Provisional Application No. 60/451,708, filed Mar. 3, 2003, entitled GARBAGE COLLECTION OF TOMBSTONES FOR OPTIMISTIC REPLICATION SYSTEMS and U.S. Provisional Application No. 60/477,638, filed Jun. 10, 2003, entitled GARBAGE COLLECTION OF TOMBSTONES FOR OPTIMISTIC REPLICATION SYSTEMS, both of which applications are incorporated herein in their entirety.

FIELD OF THE INVENTION

The invention relates generally to computer networks, and more particularly to resource replication in a computer network.

BACKGROUND

Systems for optimistic replication of resources are becoming increasingly important to ensure availability and fault tolerance in large networks. Corporate networks that replicate objects containing domain credentials and policies are one example where availability, scalability, consistency, and reliability are critical. These requirements do not necessarily interact in a cooperative manner.

One situation where the requirements for performance, scalability, and consistency collide is in propagating resource deletion information. The deletion of a resource on one machine is communicated to other machines by sending a notification referred to as a tombstone notification, or simply a tombstone. These tombstones are propagated through the network to ensure that the machines that participate in replication are notified about the deletion of a resource. As more and more tombstones accumulate due to resources being created and deleted, deleting the tombstones themselves becomes essential to limiting the amount of meta-data required for replication. However, tombstone deletion (sometimes called garbage collecting the tombstone) has not been solved in a satisfactory way in previous art.

SUMMARY

Briefly, the present invention provides a method and system for synchronizing objects among members of a replica set. Objects on members of the replica set are quickly synchronized via a join algorithm that takes advantage of version vectors. When an object is deleted, the object is tombstoned (i.e., marked as "dead"). Tombstones are also replicated between the connected members of the replica set. After a period of time (e.g., a timeout), the tombstones are deleted. A slow sync algorithm executes periodically to ensure that objects that were not deleted via replicated tombstones are eventually deleted.

Other advantages will become apparent from the following detailed description when taken in conjunction with the drawings, in which:

DETAILED DESCRIPTION

Exemplary Operating Environment

Figure 1:
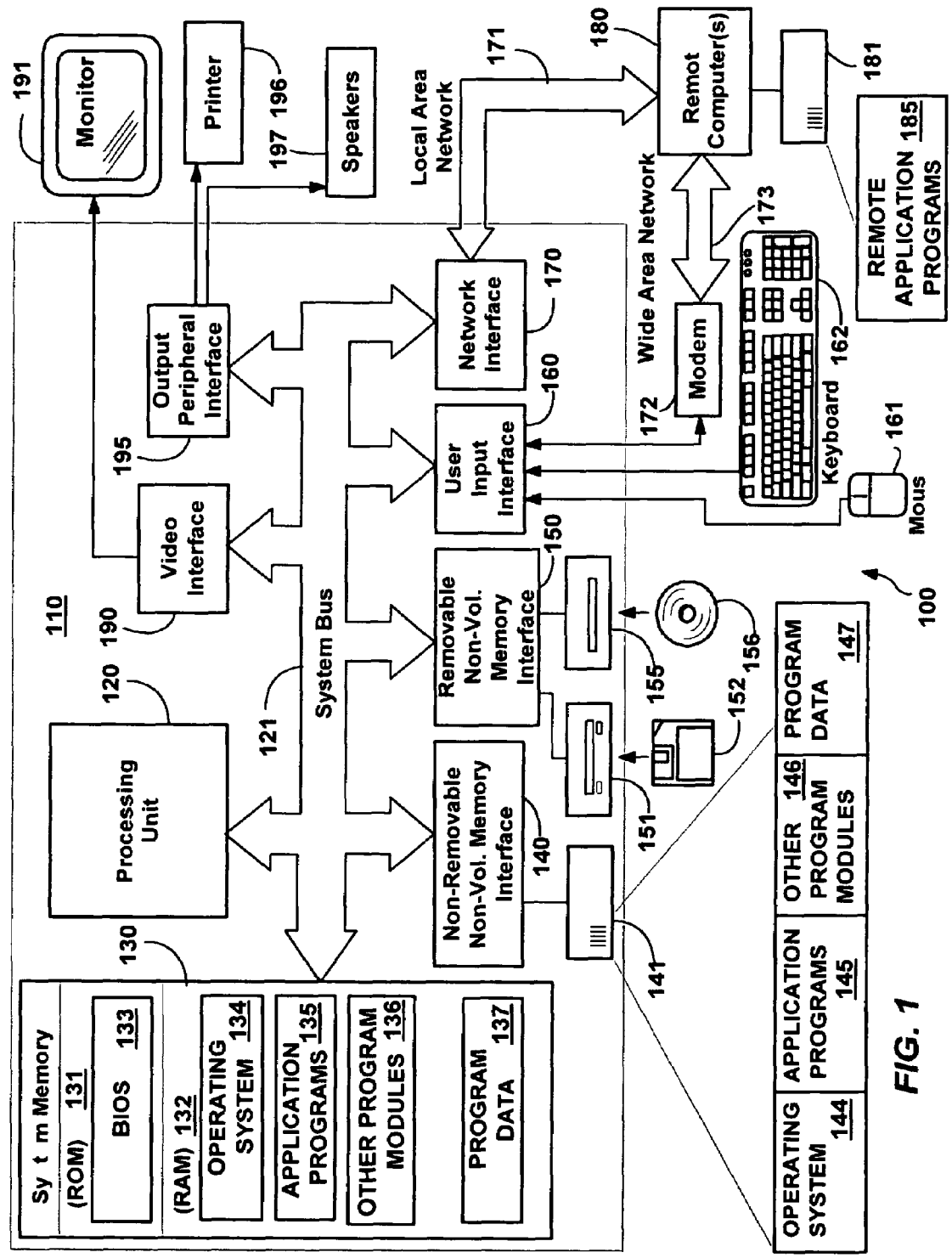
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 100 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Domains and Definitions

1. Letters A, B, C, D, E, F range over machine identifiers.
2. U ranges over unique identifiers.

machines which objects have changed, which are new, which have been deleted, and so forth. Based on this metadata exchange, the machines decide which resources need to be replicated.

Initially, the version vector mapping and database mapping for each machine are set to the empty map, i.e.:

$VV_A$:=[ ], (the empty map) for each machine A
$DB_A$:=[ ], (the empty map) for each machine A.

Two transitions capture the behaviors associated with creation and modification:

| Transition | Enabling condition | Effect | Comment |
|---|---|---|---|
| Create[A, U] | U is fresh. | Let $V = VV_A(A) + 1$<br>$VV_A(A) := V$<br>$DB_A(U) := \{ (A, V), U, 0, True \}$ | Machine A creates a resource with version V and unique identifier U |
| Change [A, U, live'] | $DB_A(U) = \{GV_A, U, c, True\}$ | Let $V = VV_A(A) + 1$<br>$VV_A(A) := V$<br>$DB_A(U) := \{ (A,V), U, c + 1, live'\}$ | Machine A changes the content associated with U and records this by assigning it a new version number. |

3. V ranges over version sequence numbers, which are represented as strictly positive natural numbers.
4. GV ranges over pairs (A, V) of machines and version numbers. These pairs are referred to as global version sequence numbers.
5. $VV_A$, $VV_B$ range over maps from machine identifiers to version numbers for machines A and B. These are known as version vectors. When a machine B is not in the domain of the map $VV_A$ we set $VV_A(B):=0$. The statement (B, V)∈$VV_A$ is shorthand for $VV_A(B) \geq V$. In this case we say that $VV_A$ subsumes (B, V). The union of two version vectors is the map that is obtained by combining the domains of the version vectors and mapping machines to the maximal value in either vector; thus: $VV_A \cup VV_B := [C \to max(VV_A(C), VV_B(C))]$.
6. c ranges over clocks that are represented by natural numbers.
7. $R_A$, $R_B$ range over resources that contain at least the metadata fields {GV, U, c, live}, where live is a Boolean value. Resources may contain other (data) fields as well, but these fields are not relevant for this discussion. There is a total ordering (i.e., <) on resources that extends the ordering on version sequence numbers. Thus, if $R_A=\{GV_A=(A,V_A), U_A, c_A, live_A\}$, $R_B=\{GV_B=(B, V_B), U_B, C_B, live_B\}$, A=B, $U_A=U_B$, and $V_A<V_B$ then $R_A<R_B$.
8. $DB_A$, $DB_B$ range over databases, which are mappings from unique identifiers to resources.

Replication Framework

Machines may create, modify, and delete resources. A resource may be thought of as an object. Each resource is associated with resource data and resource meta-data. Resource data may include content and attributes associated with the content while resource meta-data includes other attributes that may be relevant in negotiating synchronization during replication. Resource data and meta-data may be stored in a database or other suitable store; in an alternate embodiment, separate stores may be used for storing resource data and meta-data.

When replicating objects between two machines, metadata pertaining to the objects are exchanged to inform the The transition column of the table above includes a description of the action that is performed, for example, creating or changing of an object. The enabling condition column indicates the state of the system before the transition occurs. The effect column indicates logical steps taken to carry out the action. The comments column provides a brief textual description of what is accomplished with each action.

In the first line of the effect column for Create[A,U] (i.e., Let $V=VV_A(A)+1$), a new version number is calculated by adding one to the current version of A, the machine on which the resource is created. In addition to its knowledge of the versions of other machines, each machine stores its current version in its version vector (e.g., in the case of machine A, $VV_A$). In the second line (i.e., $VV_A(A):=V$), the current version of A is incremented by updating $VV_A$. In the third line (i.e., $DB_A(U):=\{(A, V), U, 0, True\}$), the database is updated by adding a new record or overwriting a previous record.

The enabling condition cell for Change[A, U, live'] gives the previous value of the database entry for the object before the change occurs. In this case, the enabling condition cell indicates that a change can occur if 1) the record exists in the database for unique identifier U, and 2) the record indicates that the object is live (i.e., not tombstoned). $GV_A$ stands for the global version of the object, U stands for the global identifier, c stands for the clock, and true indicates that the object is live.

Resources are "live" when they are created, and can be modified by any machine as long as they are live. Once "dead" (or deleted), they may no longer be modified.

To synchronize resources between two machines, the basic replication engine uses version vectors as an indirect filter to identify resources that need to be transferred from one machine to another. Each version vector pertains to a replica set. A version vector may be viewed as a global set of counters or clocks. A version vector represents a machine's knowledge of its current version and the latest version of other machines. Version vectors furthermore have the property of being able to distinguish conflicting updates from non-conflicting ones.

Figure 2:
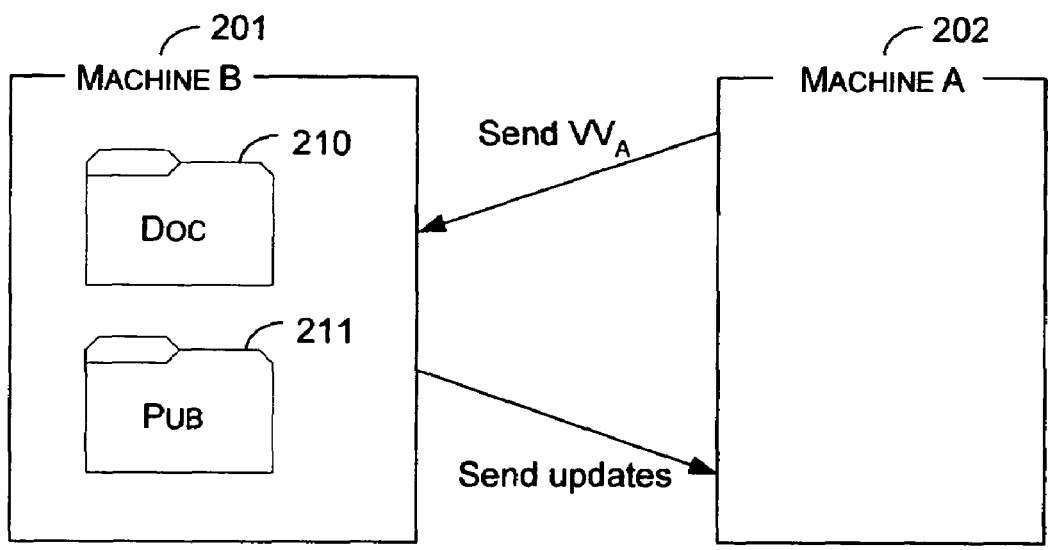
FIG. 2 is a block diagram representing a system in which two machines synchronize resources in accordance with various aspects of the invention.

FIG. 2 is a block diagram representing a system in which two machines synchronize resources in accordance with various aspects of the invention. First, machine 201 (sometimes referred to as machine B or simply B) creates objects Doc 210 and Pub 211. A replication system maintains meta-data for objects 210 and 211. When machine 201 creates the object Doc 210, the replication system assigns the object a unique identifier (e.g., $U_1$) and a unique global version (B, 1), where B is a unique identifier for machine 201 (sometimes referred to as machine B or simply B) and 1 is a counter that is incremented whenever it is used to create, modify, or delete an object on machine 201. When machine 201 creates object Pub 211, the replication system assigns the object a different unique identifier (e.g., $U_2$) and a different unique version (B, 2). Note that the unique identifier for each object is invariant throughout the life of the object no matter how many times the object is modified or replicated. The version is assigned when the object is created and it changes each time the object is modified. For example, if object Pub 211 was modified on B, its version number may change to (B, 3), for example. Another meta-data value that is maintained with respect to each object is whether the object is live or tombstoned. At the creation of each object, this value will be set to live.

The replication system on each machine also maintains a version vector. After creating the objects Doc 210 and Pub 211, the version vector maps machine 201 to the highest version value that has been assigned (i.e., 2). The version vector is used to filter out updates during synchronization, to distinguish between conflicting updates and non-conflicting updates, and in garbage collecting tombstones.

When an object is changed, its version is updated to equal the current version of the machine performing the change +1. In addition the current version of the machine performing the change is incremented by 1.

A deletion of an object includes the same steps as changing the object as outlined above plus an additional step. Specifically, the object's version is updated, the current version of the machine performing the deletion is incremented, and the live meta-data field is updated to indicate that the object has been tombstoned. After an object has been tombstoned, it can no longer be changed by future updates.

In addition, upon tombstoning an object, the content of the object may be removed from the (data) store.

Below is a table that describes a join operation. A join occurs when a machine attempts to synchronize resources with another machine.

| Transition | Enabling condition | Effect | Comment |
|---|---|---|---|
| Join[A, B, U] | True | For each U ∈ $DB_B$, such that $DB_B(U) = R_B = \{GV_B, U, c, \text{live}\}$, $GV_B \in VV_A$ $U \in DB_A$ or $R_B > DB_A(U)$ Do $DB_A(U) := R_B$ $VV_A := VV_A \cup VV_B$ | Machine A receives updates from B as B uses A's version vector to filter out records that A has not seen yet. A's database gets updated by records from B that dominate A's prior resources. |

In this table, machine A (e.g., machine 202) obtains updated objects from machine B (e.g., machine 201). To initiate this synchronization process, A sends its version vector (i.e., $VV_A(A \to 0, B \to 0)$) to B. Machine B traverses the meta-data records in its database $DB_B$ (e.g., the records corresponding to $U_1$ and $U_2$) to determine those records whose versions are not subsumed by A's version vector. Subsumed means that they have a version value that is less than or equal to the one in the version vector A. In this case, both of the versions for the records on machine B are not subsumed by the A's version vector, as the version for the object Doc 210 is 1, which is greater than $VV_A(B)$, which is equal to 0, and the version for the object Pub 211 is 2, which is also greater than $VV_A(B)$, which is also equal to 0. Thus, both objects will be propagated to A (unless there is another synchronous update to the objects elsewhere in the network that takes precedence).

If one of the objects (e.g., $U_1$) is marked with a tombstone, the meta-data of the object is propagated to machine A. This is done so that if A synchronizes with a machine that has not deleted the object, A will not request the deleted object and will be able to inform that machine of the object's deletion.

After synchronizing the objects and meta-data, A's version vector is updated to be the maximum of A's and B's version vectors. In this example, the new version vector for A will be $[A \to 0, B \to 2]$. This reflects A's knowledge of versions on A and B.

The effects column of the table above indicates the steps that occur in the synchronization. Line 1 of the effects column indicates that each record in B's database satisfying certain conditions (i.e., $U_1$ and $U_2$) will be examined. Line 2 is an assignment line that makes future reference easier by providing a shorthand notation for the record in B. Line 3 is a condition that must be met to transfer the object: the global version number of B's record (i.e. $GV_B$) must not be subsumed by the version vector of A for B (i.e. $VV_A(B)$). This condition is in fact checked on A. Those records satisfying the condition are sent to B, where the subsequent condition is checked before B's database is updated. Line 4 is another condition that must be met: Either U must not exist in A's database or U exists in A's database and the record that B sends is "better" than A's record. "Better"

encompasses notions used in replication systems to indicate which object wins and should be replicated in the case of conflicting updates. These notions are well understood in the art and will not be described in more detail here. If the conditions in lines 3 and 4 of the table are satisfied, then A's database is updated to contain an identical record for U as B's database and the object is transferred (if it has not been deleted).

After all the records have been traversed, the version vector of A is updated. In this example, $VV_A(A)$ remains at 0 and $VV_A(B)$ is updated to 2.

Slow Sync

In accordance with various aspects of the present invention, timeouts are used to delete tombstones. Following a selectable or tunable amount of time after a resource has been marked as "dead" or tombstoned, the tombstone may then be deleted. In essence, the garbage collection of tombstones can occur at any time. In one embodiment, the amount of time that elapses before garbage collecting tombstones is adaptive, depending on various factors including the number and/or generation rate of tombstones.

In addition to timeout deletion of tombstones, a pair-wise synchronization algorithm (henceforth called "slow sync") that compares contents of databases is used to ensure that content on various members of the replica set eventually is brought in sync. Slow sync typically may take much longer to execute than the pair-wise sync represented by the Join transition. The timing of when slow sync occurs, how often it occurs, and the rate at which it proceeds may be set or tuned depending on various factors. For example, if a particular machine is known to have been offline for a substantial amount of time (relative to the timeout period), when the machine resumes communication with other members in a replica set, the machine may immediately run a slow sync at an accelerated rate and then revert to a slower rate after the algorithm has completed.

With slow sync, the optimizations that can be achieved by basing synchronization on version vectors are no longer directly available. However, the required transitions may simply need to perform isolated updates and communicate a limited amount of information. The algorithm furthermore uses stable properties such that the version vectors that are used in the SSync1 and SSync2 state transitions below do not necessarily have to be up to date for the transitions to be sound.

In brief, slow sync uses the databases on the two machines involved in the slow sync. The entries in the two databases are compared in a pair-wise fashion, for each unique resource identifier for which a record exists in at least one of the databases. The entry pairs are examined for discrepancies. Entries that have discrepancies are candidates for further comparison and possible resource deletion or propagation.

Three state transitions are added to the basic replication system to support garbage collection of "dead" resources and slow sync. The first transition allows garbage collecting the "dead" resource. The two others ensure consistency between machines by propagating garbage collection based on consistency checks between the data bases. A table showing the transitions and associated effects is shown below.

| Transition | Enabling condition | Effect | Comment |
|---|---|---|---|
| Garbage Collect[A, U] | $DB_A(U) = \{GV_A, U, c, False\}$ | Delete U from $DB_A$ | Deleted record is purged from the database. |
| SSync1 [A, B, U] | $DB_A(U)=\{GV_A, U, c_A, live_A\}$ $DB_B(U)=\{GV_B, U, c_B, live_B\}$ $GV_A \in VV_B$ $GV_B \in VV_A$ $GV_A \neq GV_B$ | $live_A := False$ ($live_B := False$) | Machines A and B both have a record for U, their version vectors record the history of each other, but their records are different. In this case we can mark both records to be deleted; or just one, when applying SSync1 in only one direction. |
| SSync2 [A, B, U] | $DB_A(U) = \{GV_A, U, c_A, live_A\}$ $U \notin DB_B$ $GV_A \in VV_B$ | $live_A := False$ | Machine A has a record for U. Machine B's version vector indicates that B subsumes the knowledge for A's record, but B does not have a record for U. In this case A may mark its record for deletion. |

The first line of the table indicates that a record associated with a resource may be deleted from the database at an arbitrary point in time after the resource is no longer live (i.e., has been tombstoned). The choice of the record deletion time is immaterial for the operation of slow sync.

The enabling conditions of the next two lines of the table each provide conditions for when a live resource may be tombstoned.

The parentheses around liveB:=false of the SSync1 line of the table indicates that marking the record for deletion on machine B is optional. In a symmetric application of slow sync, the resource is typically marked for deletion on both machines A and B, while in an asymmetric application of slow sync, the resource is typically only marked for deletion on one machine (e.g., A).

The information exchanged during synchronization may include additional meta-data, such as digests. Data integrity of replicated resources may be checked by computing digests and comparing the values of the digests. Digests may be represented as strong hashes that are computed using collision resistant hash functions.

In one embodiment, a pair of asymmetric slow sync applications (i.e. between A and B, and between B and A, respectively) may be used to achieve similar effects as a single symmetric slow sync application between A and B.

Figure 3:
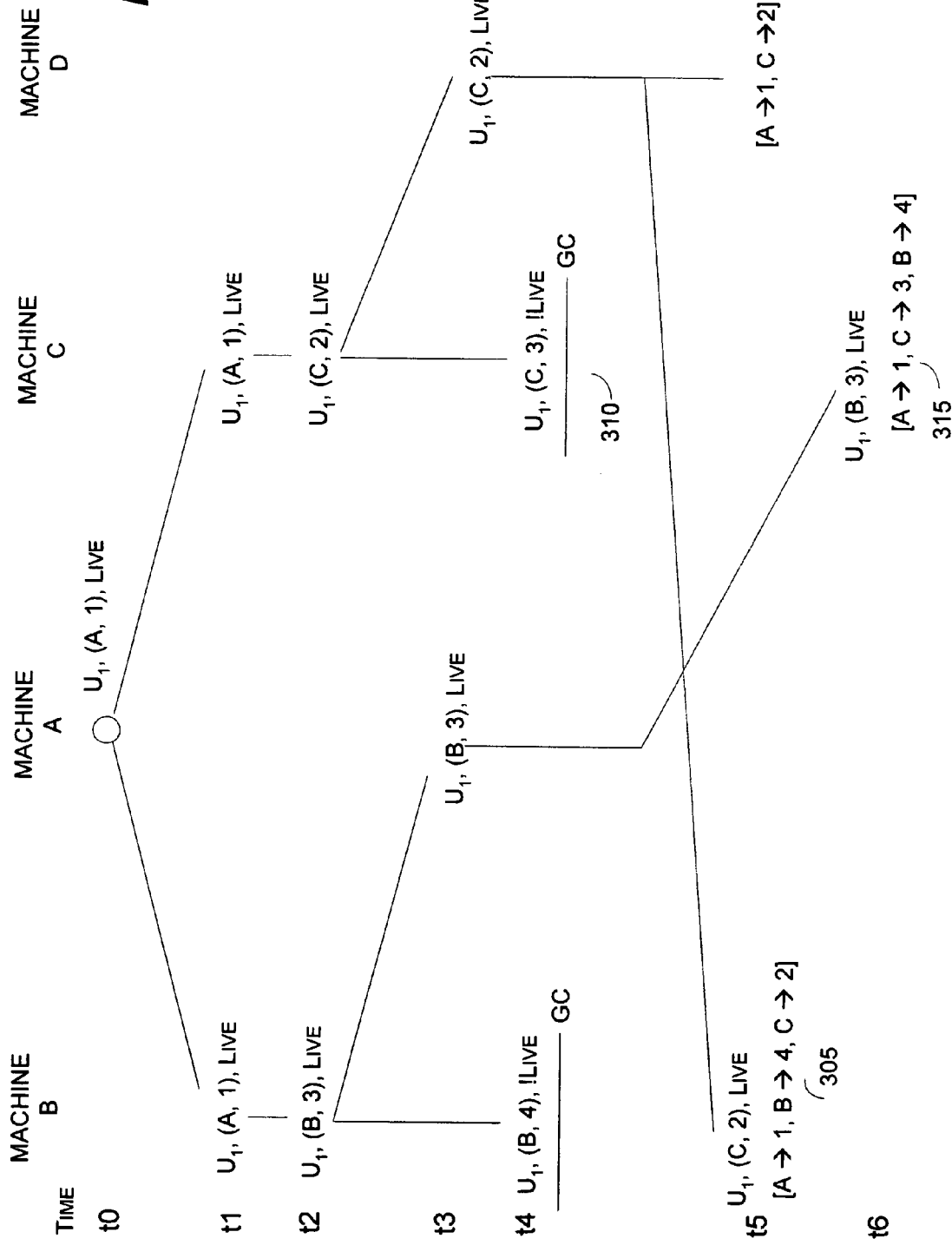
FIG. 3 is a diagram that generally represents exemplary states of replication that may occur within a replication system in accordance with various aspects of the invention.

FIG. 3 is a diagram that generally represents exemplary states of replication that may occur within a replication system in accordance with various aspects of the invention. Four machines (i.e., A, B, C, and D) that are participating in the replica set are shown. In the diagram, time flows from top to bottom, and various points in time have been labeled t0 through t6. At time t0, a resource $U_1$ has version (A, 1) and is live. Initially, resource $U_1$ resides on machine A.

At time t1, resource $U_1$ is replicated on machines B and C. Both B and C change the resource independently from each other at time t2. At time t3, B replicates its changed resource $U_1$ to A, while at time t4, C replicates its changed resource $U_1$ to D. Afterwards, both B and C delete the resource from their stores. Then, both B and C garbage collect their tombstones that are associated with the deleted resource $U_1$. At time t5, B gets D's version of $U_1$, while at time t6, C gets A's version of $U_1$. This may be done during a normal join. At this point, the tombstones that could have been used to delete the diverging content have been garbage collected. Using only the join algorithm described previously in the Join transition will cause the content of the machines to diverge. Slow sync provides a mechanism for deleting the diverging content and restoring convergence as described below in conjunction with FIGS. 4 and 5.

Figure 4:
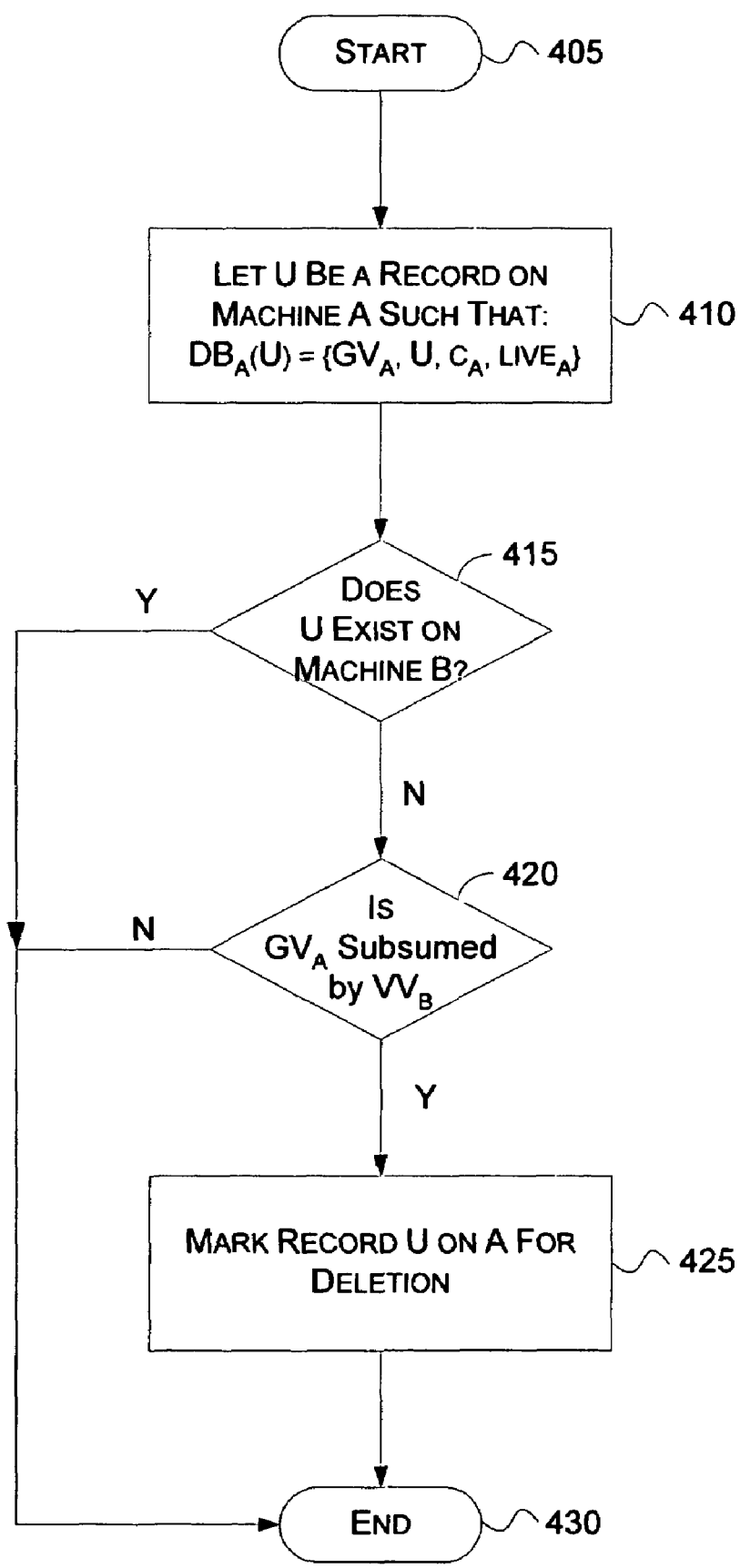
FIG. 4 is a dataflow diagram that generally represents exemplary steps that may occur in the SSync2 transition of the slow sync algorithm in accordance with various aspects of the invention.

FIG. 4 is a dataflow diagram that generally represents exemplary steps that may occur in transition SSync2 of the slow sync algorithm in accordance with various aspects of the invention. The process begins at block 405 as two machines (e.g., machine A and machine B) enter into slow sync.

At block 410 a record (U) is found on machine A. At block 415 a determination is made as to whether the record found on machine A exists on machine B. If so, processing continues at block 430; otherwise, processing continues at block 420.

At block 420, a determination is made as to whether the version of U on A (e.g., $GV_A$) is subsumed by the version vector of B (e.g., $VV_B$). If so, processing continues at block 425 where the record is marked for deletion; otherwise, processing continues at block 430.

An example of applying the steps represented in the dataflow diagram of FIG. 4 to the diagram of FIG. 3 is illustrative. Assume that transition SSync2 is applied between machines B and C when the resource of FIG. 3 has been propagated to B (e.g., at point 305) but before the resource has been propagated back to C from A (e.g, at point 315), i.e., between t5 and t6. Before slow sync is applied, B has the following characteristics for $U_1$: (C, 2), Live. The version vector for B is [A→1, B→4, C→2]. C has the following characteristics for $U_1$: it has been garbage collected and no longer exists. The version vector for C is [A→1, C→3]. At the first step, a lookup is done in C's database to determine whether a record for $U_1$ exists. It does not as it has been garbage collected. B's version of $U_1$ (i.e., $GV_B$), which equals 2, is compared with $VV_c(C)$, which equals 3. $GV_B$ is subsumed $VV_c(C)$. This indicates that the record has been deleted, the tombstone garbage collected, and that B needs to mark its record for deletion.

Figure 5:
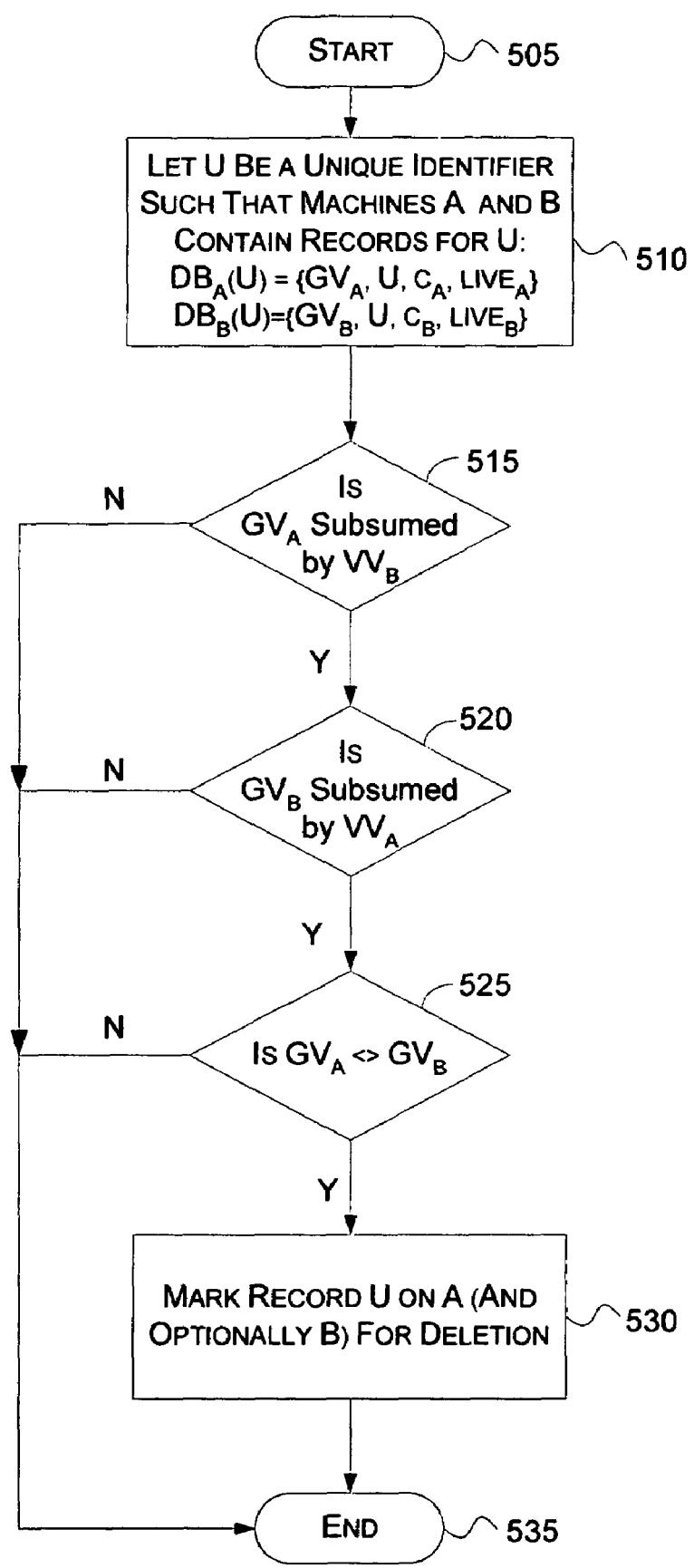
FIG. 5 is a dataflow diagram that generally represents exemplary steps that may occur in the SSync1 transition of the slow sync algorithm in accordance with various aspects of the invention.

FIG. 5 is a dataflow diagram that generally represents exemplary steps that may occur in the SSync1 transition of the slow sync algorithm in accordance with various aspects of the invention. Processing begins at block 505 after two machines (e.g., machines A and B) enter into slow sync.

At block 510 a record for unique identifier U is found on both machines. At block 515 a determination is made as to whether the version of the record found on machine A (e.g., $GV_A$) is subsumed by the version vector of B (e.g., $VV_B$). If so processing continues to block 520; otherwise processing continues to block 535.

At block 520 a determination is made as to whether the version of the record found on machine B (e.g., $GV_B$) is subsumed by the version vector of A (e.g., $VV_A$). If so processing continues to block 525; otherwise processing continues to block 535.

At block 525 a determination is made as to whether the version of the record found on machine A is not equal to the version of the record found on machine B. If so processing continues to block 530; otherwise processing continues to block 535.

At block 530, the record is marked for deletion on machine A and optionally on machine B. Marking the record for deletion on one or both machines may depend on whether the slow sync algorithm is executed in symmetric mode or asymmetric mode.

An example of applying the steps represented in the dataflow diagram of FIG. 5 to the diagram of FIG. 3 is illustrative. Assume that SSync1 is applied between machines B and C when the resource of FIG. 3 has been propagated both to B (e.g., at point 305) and to C (e.g., at point 315), i.e. after time t6. Before slow sync is applied, B has the following characteristics for $U_1$: (C, 2), Live. The version vector for B is [A→1, B→4, C→2]. C has the following characteristics for $U_1$: (B, 3), Live. The version vector for C is [A→1, C→3, B→4]. The record $U_1$ exists on both B and C (block 510). At block 515, B's version of $U_1$ (i.e., $GV_B$), which equals 2, is compared with $VV_c(C)$, which equals 3. Thus $GV_B$ is subsumed $VV_c$. At block 520, C's version of $U_1$ (i.e., $GV_c$), which equals 3, is compared with $VV_B(B)$, which equals 4. $GV_c$ is thus subsumed by $VV_B$. At block 525, we find that $GV_B<>GV_c$. This indicates that the record has been deleted, the tombstones garbage collected, and that B and C need to mark their $U_1$ records for deletion.

A further example of how a deletion may affect other machines is illustrative in further emphasizing that it is not necessarily machines A or B that are affected by the deletion, but possibly a third machine C that at some point mandated the deletion of the resource associated with U. In the trace below, "p" is used to identify a resource and primes are used to trace different versions of "p". Struck-through versions of p denote tombstones.

|  | A | B | C | D | E | F |
|---|---|---|---|---|---|---|
| A creates p | p | | | | | |
| B joins with A | p | p | | | | |
| B changes p | p | p' | | | | |
| C joins with B | p | p' | p' | | | |
| D joins with B | p | p' | p' | p' | | |
| D changes p' | p | p' | p' | p'' | | |
| C deletes p' | p | p' | | p'' | | |
| E joins with C | p | p' | | p'' | | |
| C garbage collects | p' | p' | | p'' | | |
| F joins with D | p | p' | | p'' | | p'' |
| D joins with C | p | p' | | p'' | | p'' |

Following the above sequence of actions, the values of system variables and databases are as follows:

$DB_A=[U \to \{(A,1), U, 1, True\}], VV_A=[A \to 1]$ $DB_B=[U \to \{(B,1), U, 2, True\}], VV_B=[A \to 1, B \to 1]$ $DB_C=[], VV_C=[A \to 1, B \to 1, C \to 1]$ $DB_D=[U \to \{(D,1), U, 3, True\}], VV_D=[A \to 1, B \to 1, C \to 1, D \to 1]$ $DB_E=[U \to \{(C,1), U, 4, False\}], VV_E=[A \to 1, B \to 1, C \to 1]$ $DB_F=[U \to \{(D,1), U, 3, True\}], VV_F=[A \to 1, B \to 1, D \to 1]$ Notice that, D has joined with C after C garbage collected its tombstone p'. On the other hand, F could join with E and the ordering on records (which represents a conflict resolution policy) would determine that p'' should be deleted. The transition SSync1 propagates the deletion of p'' to D when F has not garbage collected its tombstone. Transition SSync2 handles this after F garbage collects its tombstone.

We may verify that the enabling conditions for SSync1 and SSync2 are exhaustive in detecting deletions. The cases not handled by the enabling conditions are namely:

$DB_A(U)=\{GV_A, U, C_A, live_A\}$ and $GV_A \in VV_B$ $DB_B(U)=\{GV_B, U, C_B, live_B\}$ and $GV_B \in VV_A$ $DB_A(U)=\{GV_A, U, C_A, live_A\}$ and $DB_B(U)=\{GV_B, U, C_B, live_B\}$ and $GV$ The machines A and B are not synchronized in the first two cases, but the synchronization in these cases is taken care of by the Join transition. The last condition is precisely the statement that the two machines are synchronized. The value of the live field may differ, but eventual garbage collection on one party will enable the SSync2 transition.

It will be recognized that the methods described above may be used to ensure that stale content does not get reintroduced into machines. In other words, content a machine has previously seen, but which has been superseded by another version and later garbage collected, does not re-appear on that machine or any other machine that inherits its history. To obtain this result, machines may not garbage collect entries from their version vectors. If an entry $[C \to V]$ is deleted from a machine A's version vector, but B holds a record $\{(C, V), U, c, live\}$ that A deleted and later garbage collected, then execution of the transition Join[A, B] would re-introduce the previous record.

One implementation of the SSync1 and SSync2 transitions comprises a throttled iteration over the databases maintained by each machine to have its records checked with its partners. The throttled iteration may be used to conserve bandwidth or computing resources or for other reasons. A further refinement of such an implementation uses distributed set reconciliation protocols to filter out records that are identical on the two machines. The correctness of slow sync is agnostic to the particular protocol used to exchange database records, as long as all records that are not included in the symmetric (or asymmetric) set difference are examined.

Époque Timestamp

One approach that can be used in an administrated replication system involves a secondary data-structure that encodes connectivity freshness, such as an époque timestamp. A designated machine or set of machines in the replication system get their époque value updated periodically. This value may propagate to other machines during join operations or other synchronization activities. A machine that is not connected to the network does not receive updates to its époque value. When such a machine is reconnected to the network, its époque value will reflect an époque value propagated before it was disconnected. A sufficient skew on époque values of different machines may indicate that content on the machine found to drift should be invalidated. Furthermore, a machine may determine not to synchronize with a machine having an old époque value. It will be recognized that époque values may be used to delete entries from a version vector for information related to machines that have not been interacted with for a sufficient amount of time.

As previously mentioned, époques are set on a machine wide basis. Two cases are illustrative in examining époques. In the first case described below, one époque value is maintained per machine. In the second case, each machine maintains a vector of époques that associates machine identifiers with époque values. In this respect, these vectors are similar to version vectors.

A special constant, $\Delta$, the époque drift value, is introduced to avoid stale content propagating along a chain of machines that are pair-wise close, but whose combined distance is greater than what is tolerated.

When A has époque e1 and B has époque e2, there are then two main variations when synchronizing A and B:

Variation 1: $e1+\Delta \geq e2 \geq e1$. Synchronization proceeds in a standard way from either A to B or B to A. After synchronization, partners set their époques to the maximum of their own and their upstream partner's.

Variation 2: $e2 > e1+\Delta$. In this variation, A has drifted beyond the époque drift value, and B is ahead. A must re-validate its content against B.

While a single époque per machine may suffice to prevent stale content from pairs of machines, it may not be strong enough to fence-off stale content along chains of machines. To accurately record the staleness of content on a per machine basis, each machine may maintain a version vector of époques that it updates entry-by-entry when synchronizing with other machines. After a synchronizing machine synchronizes with an upstream machine whose époque is greater that the synchronizing machine, the synchronizing machine sets its époque to that greater value. Époque values for other machines are also updated similarly. When a machine synchronizes with an upstream machine, the machine sets its époque value to the maximum of the époque value for the upstream machine's époque value and the machine's own époque value. Hence, when machine A is upstream of B, époque version updates on B follow these rules:

$E_B(A) := E_A(A)$
$E_B(B) := \max(E_A(A), E_B(B))$
$E_B(C) := \max(E_A(C), E_B(C))$ for other machines C, where A's époque vector is $E_A$: $[A \to e_A, B \to e_B, C \to e_C]$ and B's is $E_B$: $[A \to e'_A, B \to e'_B, C \to e'_C]$. The machine identifier C is a place holder for other machine identifiers different than A and B. Furthermore, the assignment $E_B(C) := \max(E_A(C), E_B(C))$ may be repeated for each other machine C represented in B's époque vector.

Figure 7:
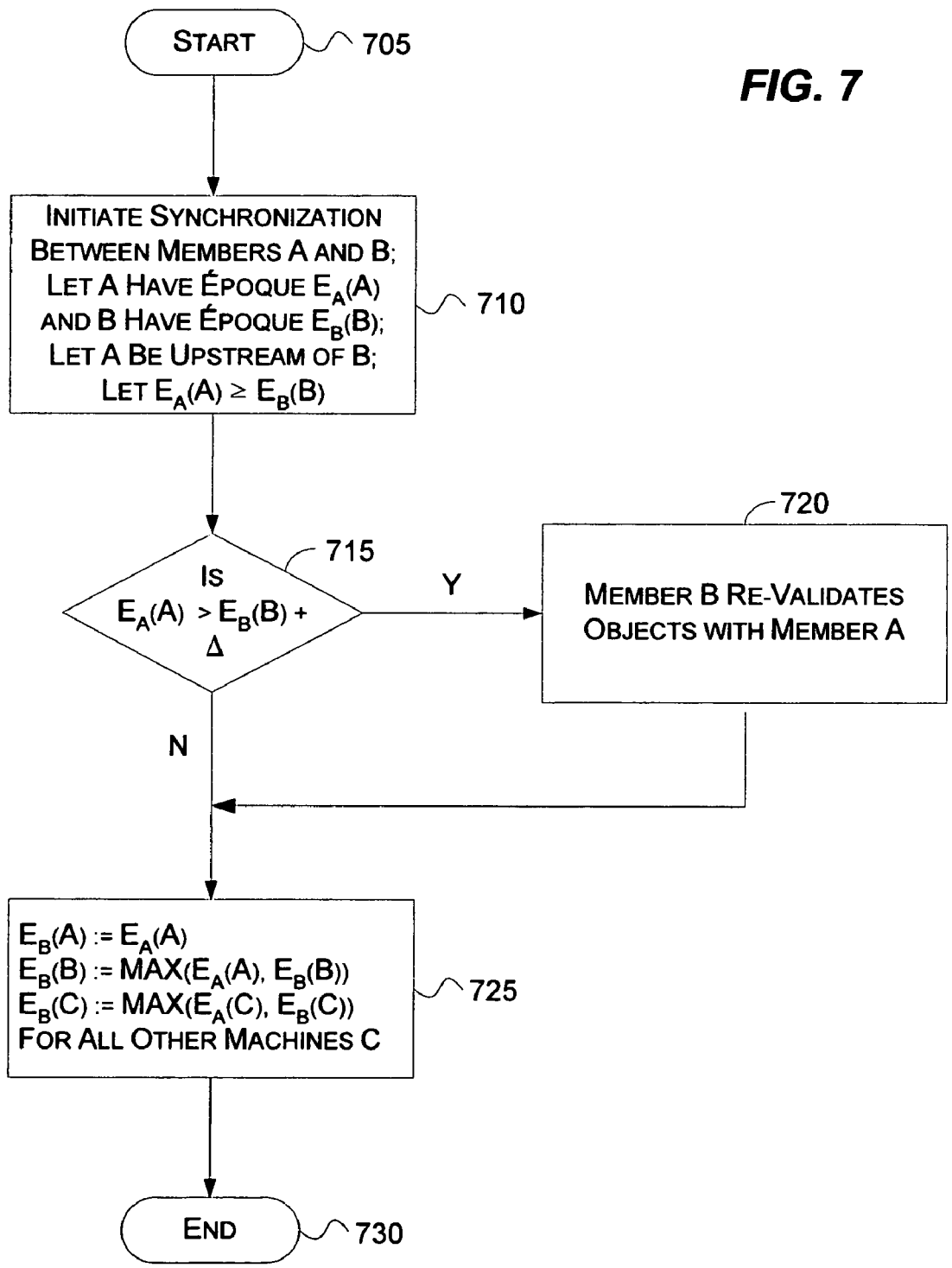
FIG. 7 is a dataflow diagram that generally represents exemplary steps that may occur in the use of époque values in accordance with various aspects of the invention.

FIG. 7 is a dataflow diagram that generally represents exemplary steps that may occur in the use of époque values in accordance with various aspects of the invention. It will be recognized that the blocks of this diagram correspond to the discussion above.

Those skilled in the art will notice that the update logic preserves the invariant $E_A(B) \leq E_B(B)$, for all A and B.

When époque vectors are updated according to the époque policies outlined above, then, synchronization using Join may be extended by an additional filtering condition as shown in the following table:

| Transition | Enabling condition | Effect | Comment |
|---|---|---|---|
| Join[A, B, U] | True | For each $U \in DB_B$, such that $DB_B(U) = R_B = \{GV_B, U, c, \text{live}\}$, $GV_B \in VV_A$ $U \in DB_A$ or $R_B > DB_A(U)$ $GV_B, = (C, V_c)$ $E_B(C) + \Delta \leq E_A(A)$ Do $DB_A(U) := R_B$ $VV_A := VV_A \cup VV_B$ | Machine A receives updates from B as B uses A's version vector to filter out records that A has not seen yet. A's database gets updated by records from B that dominate A's prior resources. |

The additional filtering condition is contained in lines 5 and 6 of the effects column. Line 5 is an assignment line that binds the pair $(C, V_c)$ to the global version number $GV_B$. This may be used to access the machine identifier, C, that is associated with the global version number. The condition in line 6 requires that the époque that B knows for machine C is within the allowed slack relative to the époque value for the receiving machine A.

The additional filter on Join prevents potentially stale content from replicating. The transitions SSync1 and SSync2 also take époques into account when introducing tombstones. This is so, as the modified Join establishes the preconditions of SSync2 without resources being ever deleted. The appropriate additional guards on SSync1 and SSync2 is to include as an enabling condition that the époque drift values between the machines are within $\Delta$.

Liveness and Fault Tolerance

Slow sync may be implemented in a replication which is weakly fair. Weakly fair means that no transition can be enabled indefinitely without eventually being taken. It will be recognized by those skilled in the art that this is a desirable property for practical implementation of a replicator.

The slow sync method described herein may be used as a further check to make sure that content is properly propagated by other replication mechanisms (e.g., join) of a replication system. Slow sync may also be used in addition to other replication mechanisms to recover from synchronization operations that are affected by data corruption (e.g., single bit errors, data structure corruption, or otherwise). The slow sync method may compare digests of objects, contents of objects, or may use other attributes of objects or any other data that indicates that corruptions has occurred or that an object has not been properly propagated.

Convergence, Synchronization, and Soundness

The assumption of weak fairness is relevant in order to establish convergence. A significant aspect of slow sync is that it ensures that members participating in replication eventually converge to the same content. Partners that have the same content are synchronized. Furthermore, slow sync is sound as it identifies the set of tombstones that have been garbage collected: if slow sync identifies a record as "dead," the record has been subsumed by a tombstone.

More precisely, consider a finite set of partners $A_1, A_2, A_3, \ldots, A_n$. A computation involving partners $A_1, \ldots, A_n$ is a finite or infinite sequence of states characterized by the contents of the partners database and version vectors. Consecutive pairs of states in a computation are either identical or obtained by applying one of the transitions Create, Change, Join, Garbage Collect, SSync1, or SSync2.

A significant convergence and synchronization aspect of transitions SSync1 and SSync2 is that for every infinite such computation, where transitions Create, Change, and Garbage Collect are exercised only finitely often, and transitions Join, SSync1, and SSync2 are applied in a weakly fair manner, there is a state, reachable after a finite number of steps where all machines $A_3, \ldots, A_n$ are synchronized.

A soundness property of slow sync stipulates that every tombstone entry in the synchronized state is either obtained directly as a result of the transition Change, or indirectly from SSync1 or SSync2. In the latter case, such entries are subsumed (in the ordering<on database records) by entries obtained directly from the transition Change, which marked the entry as "dead".

AsmL Model

Following is an exemplary AsmL model that may be used in modeling, simulating, implementing, defining, and formally verifying some of the methods described above. It should be noted, however, that other implementations and variation may also be used without departing from the spirit or scope of the present invention.

| Resource |
|---|

```
// Basic Domains and Definitions
type MachineId = Integer
type GlobalValue = (MachineId,Integer)
structure ResourceName
    name as String
structure Resource implements System.IComparable
    GV    as GlobalValue
    Name  as ResourceName
    Clock as Integer
    Live  as Boolean
    function IsBetterThan (resource as Resource) as Boolean
        if First(me.GV) = First(resource.GV) then
            if (Second(me.GV) ne Second(resource.Gv)) then
                return (Second(me.GV) > Second(resource.Gv))
            else
                return me.Live < resource.Live
        elseif me.Clock ne resource.Clock then
            return (me.Clock > resource.Clock)
        else
            return (First(me.GV) < First(resource.GV))
    public function CompareTo (o as Object) as Integer
        resource = o as Resource
        if me = resource then return 0
        elseif me.IsBetterThan(resource) then return 1
        else return −1
    function ToBeDeleted( ) as Resource
        let Resource(gv,name,clock,live) = me
        return Resource(gv,name,clock,false)
```

| State of a machine |
|---|

```
type VerVector = Map of MachineId to MachineId
type DataBase = Map of ResourceName to Resource
class Machine
    // Basic Definitions
    const Name as MachineId
    var    DB   as DataBase  = {->}
    var    VV   as VerVector = {->}
    // -----=== monitoring part ===-----
    // History State
    var    DBbest as DataBase = {->}
    var    Known as Map of ResourceName to Set of Resource = {->}
    function VecValue(m as Integer) as Integer
        if m in Indices(me.VV) then me.VV(m) else 0
    function Knows(gv as GlobalValue) as Boolean
        let (m,n) = gv
        me.VecValue(m) >= n
    function ResourceIsAlive(id as ResourceName) as Boolean
        (id in me.DB) and then me.DB(id).Live
    function ResourceIsDead(id as ResourceName) as Boolean
        (id in me.DB) and then not me.DB(id).Live
    // SSync1
    function Sync1Condition(mac as Machine, id as ResourceName) as Boolean
        if (id in me.DB) and (id in mac.DB) then
            let gv  = me.DB(id).GV
            let gv' = mac.DB(id).GV
            return me.Knows(gv') and mac.Knows(gv) and (gv ne gv')
        else
            false
    // SSync2
    function Sync2Condition(mac as Machine, id as ResourceName) as Boolean
        return (id in me.DB) and (id notin mac.DB) and then mac.Knows(me.DB(id).GV)
    // Proof
    function Invariant1( ) as Boolean
        return forall u in me.Known holds
            me.Known(u) = {r | r in AllGeneratedVersions(u) where me.Knows(r.GV)}
    function Invariant2( ) as Boolean
        return forall u in me.Known holds me.DBbest(u) in AllGeneratedVersions(u)
    function Invariant3( ) as Boolean
        return forall u in me.Known holds forall r in me.Known(u) h lds
            me.DBbest(u).IsBetterThan(r) or me.DBbest(u)=r
```

-continued

```
function KeyInvariant( ) as Boolean
    return forall u in me.Known holds
        if me.DBbest(u).Live then me.DBbest(u) = me.DB(u)
constraint Invariant1( ) and Invariant2( ) and Invariant3( ) and KeyInvariant( )
```

Transitions of a machine

```
class Machine
    // Create[U, A]
    procedure CreateResource (id as ResourceName)
        require Fresh(id)
        version = VecValue(me.Name) + 1
        resource = Resource ((me.Name,version), id, 0, true)
        me.DB += {id->resource}
        me.VV += {me.Name->version}
        Fresh(id) := false
        // -----=== monitoring part ===-----
        me.DBbest(id) := resource
        me.Known(id) := {resource}
        AllGeneratedVersions(id) := {resource}
    // Change[U, A]
    procedure EditResource (id as ResourceName, live as Boolean)
        require ResourceIsAlive(id)
        version = VecValue(me.Name) + 1
        rc = me.DB(id)
        clock = rc.Clock + 1
        resource = Resource((me.Name,version), id, clock, live)
        me.DB += {id->resource}
        me.VV += {me.Name->version}
        // -----=== monitoring part ===-----
        if resource.IsBetterThan(me.DBbest(id)) then me.DBbest(id) := resource
        add resource to me.Known(id)
        add resource to AllGeneratedversions(id)
    // Join[A, B]
    procedure Join (mac as Machine)
        me.VV := Union(me.VV, mac.VV)
        forall id in mac.DB
            resource = mac.DB(id)
            if not me.Knows(resource.GV) then
                if id notin me.DB or else resource.IsBetterThan(me.DB(id)) then
                    me.DB(id) := resource
            // --------=== monitoring part ===-----
            if id n tin me.Known then
                me.Known(id) := mac.Known(id)
                me.DBbest(id) := mac.DBbest(id)
            else
                me.Known(id) := me.Known(id) + mac.Known(id)
                if mac.DBbest(id).IsBetterThan(me.DBbest(id)) then
                    me.DBbest(id) := mac.DBbest(id)
// Garbage Collect[A, U] (GC[A, U])
procedure GCollect(id as ResourceName)
    require me.ResourceIsDead(id)
    remove me.DB(id)
// Combined slow syncs
procedure SlowSync(mac as Machine, id as ResourceName)
    require Sync1Condition(mac, id) or Sync2Condition(mac, id)
    me.DB(id) := me.DB(id).ToBeDeleted( )
    // -----=== monitoring part ===-----
    if mac.DBbest(id).IsBetterThan(me.DBbest(id))
        then me.DBbest(id) := mac.DBbest(id)
```

Auxiliary global definitions

```
// Basic definitions
function Union(v1 as VerVector, v2 as VerVector) as VerVector
    return { x -> mymax(v1,v2,x) | x in (v1 + v2) }
function mymax (m1 as VerVector, m2 as VerVector, a as Integer) as Integer
    require a in m1 + m2
    return if a notin m1 then m2(a)
        elseif a notin m2 then m1(a)
        elseif m1(a) > m2(a) then m1(a)
        else m2(a)
function Monitor( ) as Seq of (Set of Boolean)
    return [{m.DBbest(u).Live | u in m.DBbest} | m in ToSet(Net)]
```

Network model (Used for simulation)

```
const NumberOfMachines = 3
var   Net   as Seq of Machine = [new Machine(k) | k in [0..NumberOfMachines-1]]
```

```
-continued var     Fresh as Map of ResourceName to Boolean = {r -> true | r in Resources }
        // -----=== monitoring part ===-----
var     AllGeneratedVersions as Map of ResourceName to Set of Resource = {->}
const Resources = { ResourceName(str) | str in {"r0", "r1", "r2"}}
c nst Transitions = {"Create", "Edit", "Join", "GC", "SSync"}
procedure RandomAction ( ) as Boolean
    net = ToSet(Net)
    choose mac in net,
            act in Transitions,
            id in Resources,
            pc in net,
            l in {true, false}
        head = act + " " + ToString(mac.Name) +" "
        match act
            "Create":   if Fresh(id) then
                            mac.CreateResource(id)
                            info = id.name
                            //WriteLine([m.VV | m in Net] + "\r\n\r\n" + head + info)
            "Edit"   :  if mac.ResourceIsAlive(id) then
                            mac.EditResource(id, l)
                            info = id.name +" " + ToString(l)
                            //WriteLine([m.VV | m in Net] + "\r\n\r\n" + head + info)
            "Join"   :  if mac ne pc then
                            mac.Join(pc)
                            info = pc.Name
                            //WriteLine([m.VV | m in Net] + "\r\n\r\n" + head + info)
            "GC"     :  if mac.ResourceIsDead(id) then
                            mac.GCollect(id)
                            info = id.name
                            //WriteLine([m.VV | m in Net] + "\r\n\r\n" + head + info)
            "SSync" :   if mac.Sync1Condition(pc, id) or mac.Sync2Condition(pc, id) then
                            mac.SlowSync(pc, id)
                            info = ToString(pc.Name) + " " + id.name
                            //WriteLine([m.VV | m in Net] + "\r\n\r\n" + head + info)
        return mac.Invariant1( ) and mac.Invariant2( ) and mac.Invariant3( ) and
mac.KeyInvariant( )

Model execution procedure RunAction(n as Integer) as Seq of Boolean
    var res as Seq of Boolean = []
    step for i=1 to n
        res += [RandomAction( )]
    step
        return res
Main( )
    o = explore RunAction(2)
    WriteLine(ToString(Size(o)) + " paths tried")
    WriteLine(ToSet(o))
```

Figure 6:
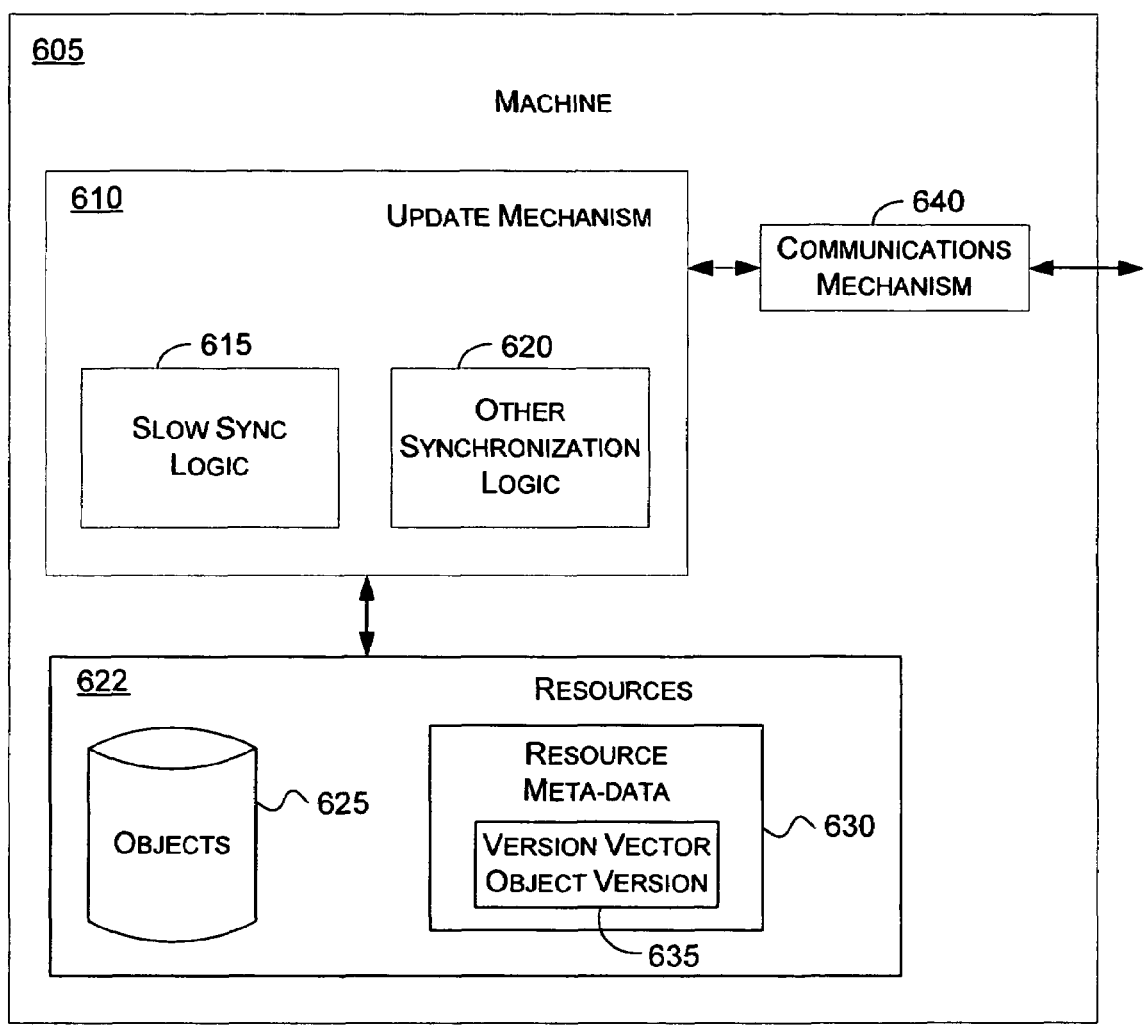
FIG. 6 is a block diagram representing a machine configured to operate in a resource replication system in accordance with various aspects of the invention.

FIG. 6 is a block diagram representing a machine configured to operate in a resource replication system in accordance with various aspects of the invention. The machine 605 includes an update mechanism 610, resources 622, and a communications mechanism 640.

The update mechanism 610 includes slow sync logic 615 that operates as described previously. The other synchronization logic 620 includes synchronization logic other than the slow sync logic (e.g., join and deletion of tombstones). Although the slow sync logic 615 and the other synchronization logic are shown as separate boxes, they may be combined in whole or in part.

The resources 622 include the objects store 625 for storing objects and the resource meta-data store 630. Although shown in the same box, the objects store 625 may be stored together or in a separate store relative to the resource meta-data store 630. Among other things, resource meta-data store 630 includes object versions for each of the object in objects store 625 as well as a version vector (block 635).

The communications mechanism 640 allows the update mechanism 610 to communicate with other update mechanisms (not shown) on other machines. Together, the update mechanisms determine which resources should be synchronized and how the synchronization may occur. The communications mechanism 640 may be a network interface or adapter 170, modem 172, or any other means for establishing communications as described in conjunction with FIG. 1.

It will be recognized that other variations of the machine shown in FIG. 6 may be implemented without departing from the spirit or scope of the invention.

It will be recognized that the method and system described above address many of the problems associated with the prior art. Among other things, aspects of the invention described herein allow machines to be separated from other machines participating in a replica set for an arbitrary amount of time and then reconnected while allowing deletion of tombstones and providing consistency across the machines participating in the replica set.

As can be seen from the foregoing detailed description, there is provided an improved method and system for replicating resources in a computer system. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer implemented method for deleting replicated objects and providing for garbage collection of tombstones within a replica set, the method comprising:

the computing system replicating an object that resides on a member of the replica set to at least one other member of the replica set, the replica set including at least two members;

deleting the object on at least one member of the replica set and indicating on that member of the replica set that the object has been deleted via at least one tombstone indicating the deletion of the object;

deleting at least one of the at least one tombstone; and thereafter:

locating the object or a modified form of the object, having replaced the object, on a member of the replica set;

locating a different member of the replica set upon which the object has been deleted and upon which the tombstone indicating the deletion of the object has been deleted;

comparing version information of the member of the replica set with version information of the different member of the replica set;

determining when the object on the member of the replica set is subsumed by the different member of the replica set; and when having determined that the object on the member of the replica set is subsumed by the version information of the different member of the replica set, deleting the object or modified form of the object from the member of the replica set.

2. The method of claim 1, wherein locating the object or a modified form of the object, having replaced the object, comprises finding a record in a database of a first member of the replica set, the record indicating a version of the object and that the object is live.

3. The method of claim 1, wherein determining that the object is subsumed by the version information comprises determining that the version of the object is less than or equal to the second member's last-known version of any object on the first member.

4. The method of claim 1, wherein locating the object or a modified form of the object, having replaced the object, comprises finding a record in a database of a first member of the replica set and a record in a database of a second member of the replica set, each record indicating a version of the object residing on its respective member and that the object is live.

5. The method of claim 1, wherein comparing version information comprises:

obtaining a first and second version vector for the first and second members, respectively, the first version vector indicating a last-known version of any object on the second member and the second version vector indicating a last-known version of any object on the first member;

determining that the version of the object of the first member is subsumed by the second version vector;

determining that the version of the object of the second member is subsumed by the first version vector; and determining that the versions of the objects are different from each other.

6. The method of claim 1, wherein deleting at least one of the at least one tombstone comprises deleting all of the tombstones.

7. The method of claim 1, wherein the object is associated with a version.

8. The method of claim 7, further comprising setting the version of the object when the object is created.

9. The method of claim 7, further comprising updating the version of the object when the object is modified or deleted.

10. The method of claim 1, wherein the object as it exists on a member of the replica set is prevented from being modified on that member after indicating that the object is deleted via the one or more tombstones.

11. The method of claim 1, wherein each member of the replica set maintains a version vector, the version vector indicating its respective member's last-known version of any objects in each of the other members of the replica set.

12. The method of claim 11, wherein the version vector of a member that is synchronizing with another member is updated to the maximum of the version vectors of that member and the other member.

13. The method of claim 11, wherein not having information in a version vector for a particular member indicates that the last-known version of the particular member is zero.

14. The method of claim 13, wherein a version vector of a particular member is incremented each time an object is created, changed, or deleted on the particular member.

15. The method of claim 1, wherein the object is associated with a global identifier that remains constant as the object is modified, deleted, and replicated.

16. The method of claim 1, wherein deleting at least one of the at least one tombstone occurs after a period of time.

17. The method of claim 16, wherein the period of time depends on how many tombstones exist.

18. The method of claim 16, wherein the period of time depends on a measure of a generation rate for tombstones.

19. The method of claim 1 wherein processing information other than the one or more tombstones occurs when a member resumes communication with other members in a replica set before attempting to synchronize via a join if the member has not communicated with the other members over a period of time.

20. The method of claim 19, wherein the period of time exceeds a timeout at which tombstones are deleted.

21. The method of claim 1, wherein comparing version information is throttled to conserve bandwidth or computing resources.

22. A computer program product comprising a computer-readable storage medium having recorded thereon computer-executable instructions which, when executed, perform the method of claim 1.

23. A computer system comprising one or more computer processors and one or more computer-readable storage media storing computer-executable instructions that, when executed, implement the method recited in claim 1.

* * * * *